(12) United States Patent
Koshikawa

(10) Patent No.: US 8,991,998 B2
(45) Date of Patent: Mar. 31, 2015

(54) PRINTING APPARATUS

(71) Applicant: Canon Kabushiki Kaisha, Tokyo (JP)

(72) Inventor: Masahiro Koshikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 13/800,110

(22) Filed: Mar. 13, 2013

(65) Prior Publication Data

US 2013/0258013 A1 Oct. 3, 2013

(30) Foreign Application Priority Data

Mar. 30, 2012 (JP) .................................. 2012-079280

(51) Int. Cl.
*B41J 11/00* (2006.01)

(52) U.S. Cl.
CPC ............ *B41J 11/0015* (2013.01); *B41J 11/002* (2013.01)
USPC .......................................... 347/102; 347/104

(58) Field of Classification Search
CPC ........ B41J 2/01; B41J 11/0015; B41J 11/002; B41J 11/0065; B41J 11/007; B41J 11/0085; B41J 11/06; B41J 13/103; B41M 7/0072; C09D 11/101
USPC ......... 347/2–4, 101–104, 108, 109; 271/3.14, 271/8.1
See application file for complete search history.

(56) References Cited

U.S. PATENT DOCUMENTS

| | | | | |
|---|---|---|---|---|
| 2001/0022594 | A1* | 9/2001 | Yoshida et al. | 347/2 |
| 2004/0096256 | A1* | 5/2004 | Hayashi et al. | 400/621 |
| 2006/0092192 | A1* | 5/2006 | Vo | 347/2 |
| 2006/0244802 | A1* | 11/2006 | Chen | 347/104 |
| 2007/0002116 | A1* | 1/2007 | Budelsky et al. | 347/104 |
| 2011/0273522 | A1* | 11/2011 | Kanazawa | 347/102 |

FOREIGN PATENT DOCUMENTS

JP 2008-254221 A 10/2008

* cited by examiner

*Primary Examiner* — Manish S Shah
*Assistant Examiner* — Roger W Pisha, II
(74) *Attorney, Agent, or Firm* — Fitzpatrick, Cella, Harper & Scinto

(57) ABSTRACT

In a printing apparatus with a unit for performing a post processing after printing, visibility and operability from the downstream side can be improved. The printing apparatus includes a first unit configured to perform printing on a sheet; and a second unit configured to perform a predetermined process for the sheet, the second unit being capable of shifting between a first position and a second position. A part of the second unit becomes a support of the sheet for printing by the first unit when the second unit is in the first position, and the part does not become the support when the second unit is in the second position.

13 Claims, 12 Drawing Sheets

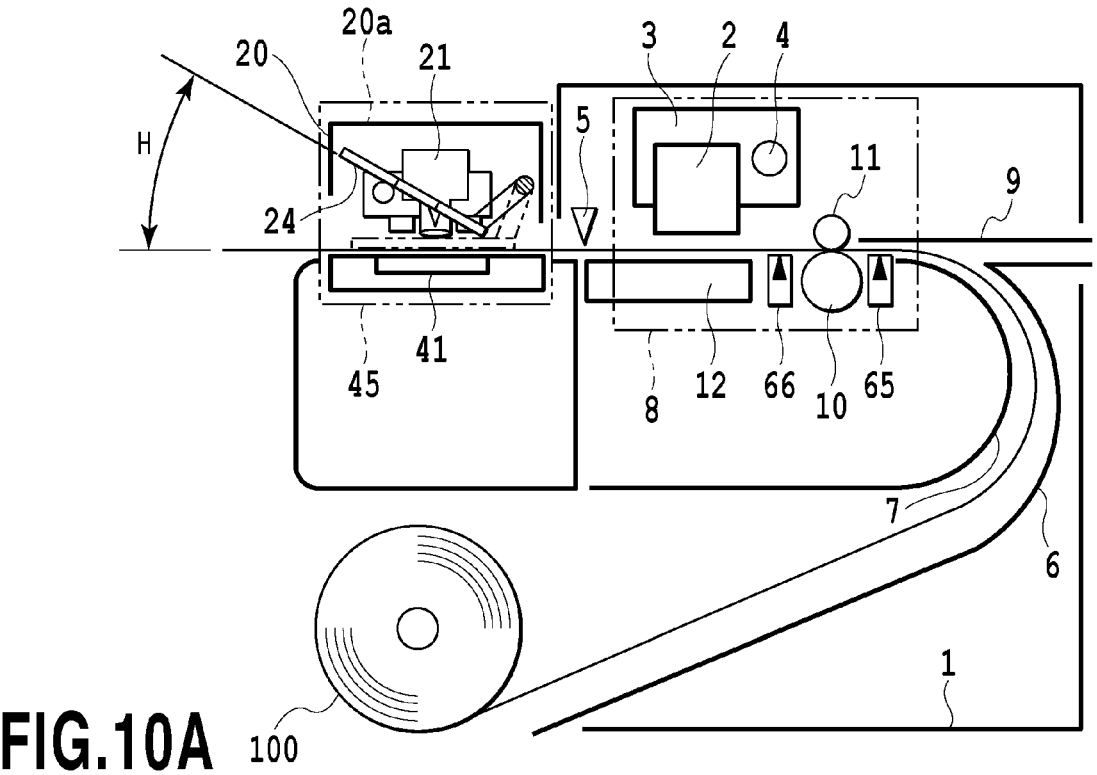
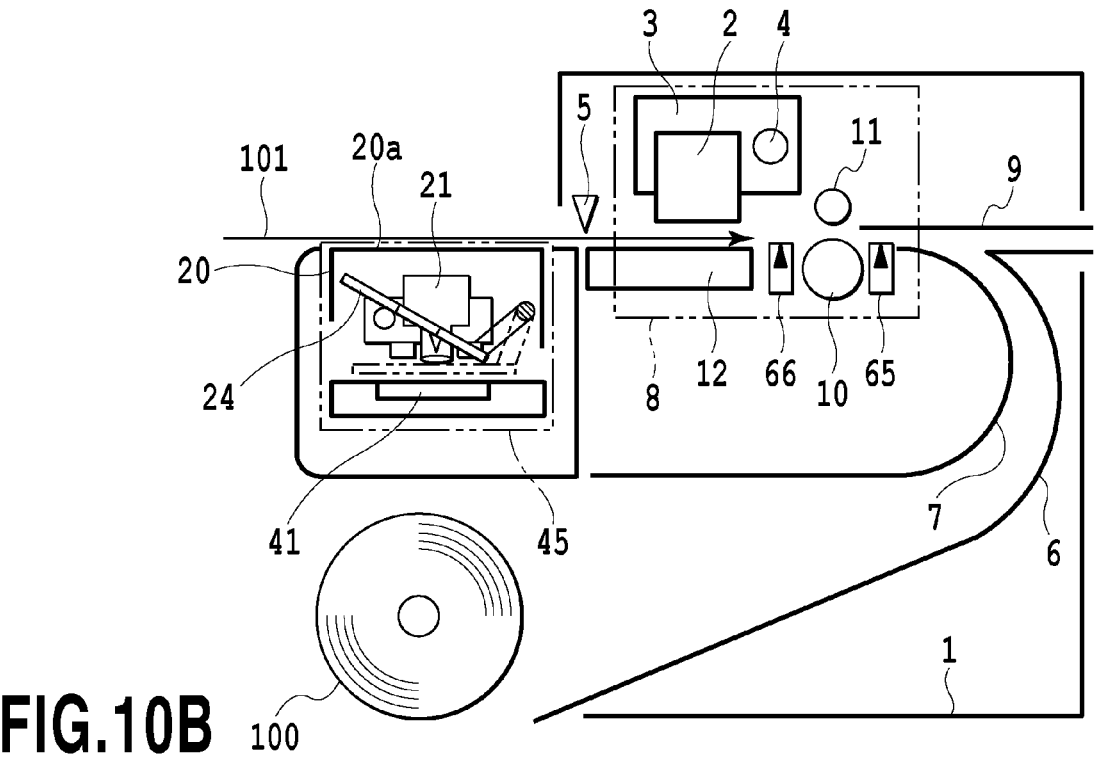

US 8,991,998 B2

PRINTING APPARATUS

BACKGROUND OF THE INVENTION

1. Field of the Invention

The present invention relates to a printing apparatus, and particularly to a printing apparatus performing a post processing after performing printing.

2. Description of the Related Art

As to a printing apparatus, there is a printing apparatus in which when printing is finished on a sheet, the sheet is further conveyed, wherein the post processing is performed on the sheet by a post processing unit provided downstream of printing means in the conveying direction. For example, Japanese Patent Laid-Open No. 2008-254221 discloses a printing apparatus comprising a color measuring section for color measuring a region printed on the sheet, and a drying section for drying the sheet, which are provided downstream of the printing means in the conveying direction.

To the printing means, there are some cases where taking-out of the discharged sheet or manual sheet feeding of the sheet is performed from the downstream side in the sheet conveying direction.

However, in the printing apparatus with the post processing unit disclosed in Japanese Patent Laid-Open No. 2008-254221, the post processing unit is arranged downstream of the printing means in the sheet conveying direction (hereinafter, called also the downstream side). Therefore the post processing unit blocks the downstream side of the printing means, which therefore deteriorates visibility from an outside of the printing apparatus to a discharge component, and in a case where a user performs an operation such as manual sheet feeding of the sheet, the operability may possibly deteriorate.

SUMMARY OF THE INVENTION

The present invention is made in view of the foregoing problems, and an object of the present invention is to, in a printing apparatus provided with a unit for performing a post processing after printing, improve the visibility and operability for a user from the downstream side.

Therefore, according to one aspect of the present invention, a printing apparatus comprises a first unit configured to perform printing on a sheet; and a second unit configured to perform a predetermined process for the sheet, the second unit being capable of shifting between a first position and a second position, wherein a part of the second unit becomes a support of the sheet for printing by the first unit when the second unit is in the first position, and the part does not become the support when the second unit is in the second position.

According to the present invention, the second unit for performing the post processing shifts to a position of not blocking the downstream side of the first unit, thus realizing the printing apparatus which can improve the visibility and operability for a user from the downstream side of the first unit.

Further features of the present invention will become apparent from the following description of exemplary embodiments (with reference to the attached drawings).

BRIEF DESCRIPTION OF THE DRAWINGS

FIG. 10A and FIG. 10B are cross sections diametrically showing an inkjet printing apparatus according to a fourth embodiment;

DESCRIPTION OF THE EMBODIMENTS

Hereinafter, embodiments according to the present invention will be in detail explained with reference to the accompanying drawings.

(First Embodiment)

Figure 1:
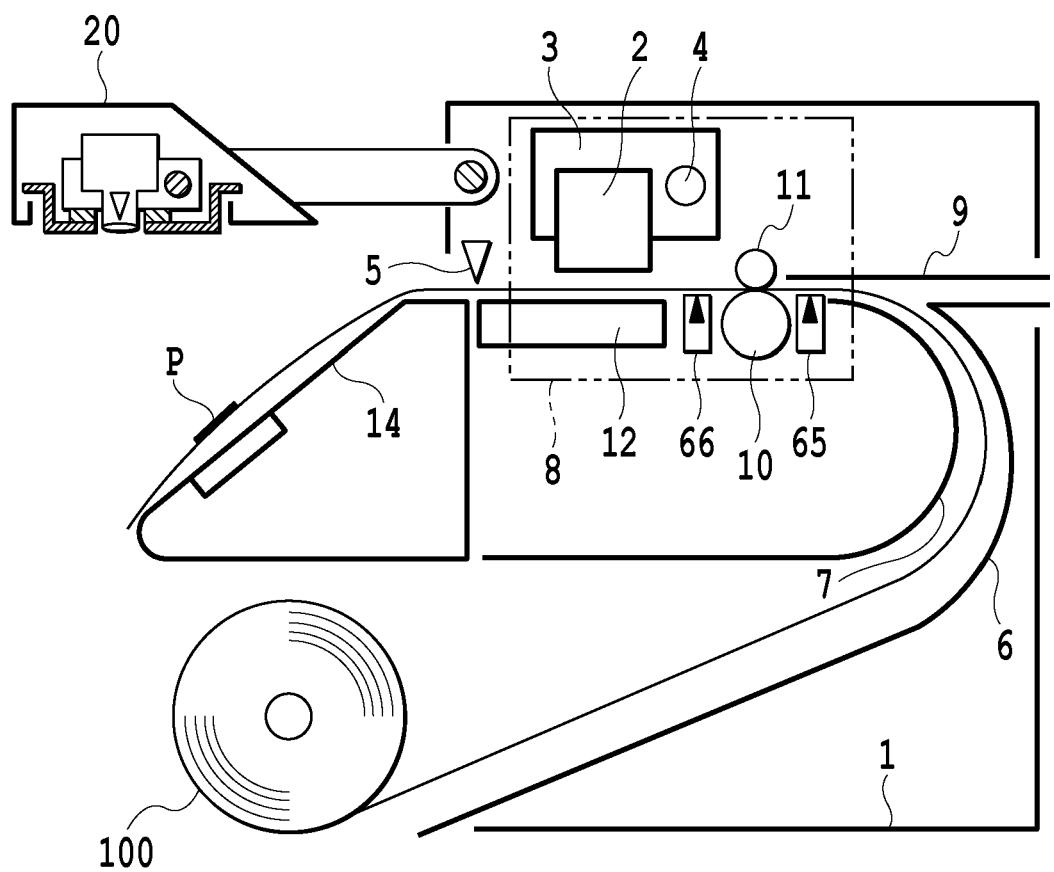
FIG. 1 is a cross section diametrically showing an inkjet printing apparatus according to a first embodiment of the present invention.

FIG. 1 is a cross section diametrically showing an inkjet printing apparatus provided with a color measuring device according to the present embodiment. The printing apparatus according to the present embodiment is a printing apparatus which can perform printing respectively on a roll sheet formed of a long sheet wound in a roll shape and on a cut sheet which is in advance cut to a standard size. First, the configuration of the printing apparatus will be explained by taking the roll sheet as an example.

A roll sheet 100 set from a front surface of an inkjet printing apparatus 1 and formed of a long sheet held at the downward side in the apparatus and wound in a roll shape passes through a U-letter shaped sheet conveying path formed by an outer guide 6 and an inner guide 7, and is conveyed downstream. When a front end of the roll sheet 100 reaches through a sheet end sensor (A) 65 to a nip portion between a conveying roller 10 and a pinch roller 11, the roll sheet 100 is clipped and held between the conveying roller 10 and the pinch roller 11, and is conveyed through a sheet end sensor (B) 66 to printing means 8.

The printing means 8 is configured by the conveying roller 10, the pinch roller 11, a print head 2 of an inkjet system (inkjet head), a carriage 3 for mounting the print head 2, and a platen 12 arranged so as to oppose the print head 2. The carriage 3 is slidably supported along a carriage shaft 4 arranged in parallel to a scan direction of the carriage 3 and a guide rail (not shown). In the printing means 8, when printing is performed by a scan corresponding to one line by a forward or backward movement of the carriage 3, the roll sheet 100 is conveyed by a predetermined pitch in the conveying direction by the conveying roller 10 and the pinch roller 11, and the carriage 3 is again made to scan to perform printing of the next line. This process is repeated to form an image across an entire page.

The printed part of the roll sheet 100 is conveyed to the downstream side in the conveying direction. As the printing is finished, the roll sheet 100 is conveyed to a predetermined cut position, and is then cut by a cutter 5. The cut roll sheet 100 is discharged from a discharge guide 14 in a forward side of the printing apparatus to a discharge basket (not shown), thus making it possible to obtain a printed matter on which a designated image is printed.

A color measuring sensor unit 20 is provided downstream of the printing means 8 in the conveying direction, which is arranged in a position opposing the discharge guide 14, and color-measures color information of a color patch (color pattern) printed by the printing means 8. At the time of color measuring the color information of the color patch, after the printing of the color patch by the printing means 8 is finished, the color patch P printed on the roll sheet 100 is conveyed to a predetermined color measuring position between the discharge guide 14 and the color measuring sensor unit 20 by the conveying roller 10. As the color patch P is conveyed to the predetermined color measuring position, the color measuring sensor unit 20 goes down, and the roll sheet 100 is clipped between the color measuring sensor unit 20 and the discharge guide 14, where a color measuring operation of the color patch is performed. When the color measuring operation is finished, the roll sheet 100 is conveyed to a predetermined cut position, and is then cut by the cutter 5. The cut roll sheet 100 is discharged from the discharge guide 14 to the discharge basket (not shown).

Figure 2:
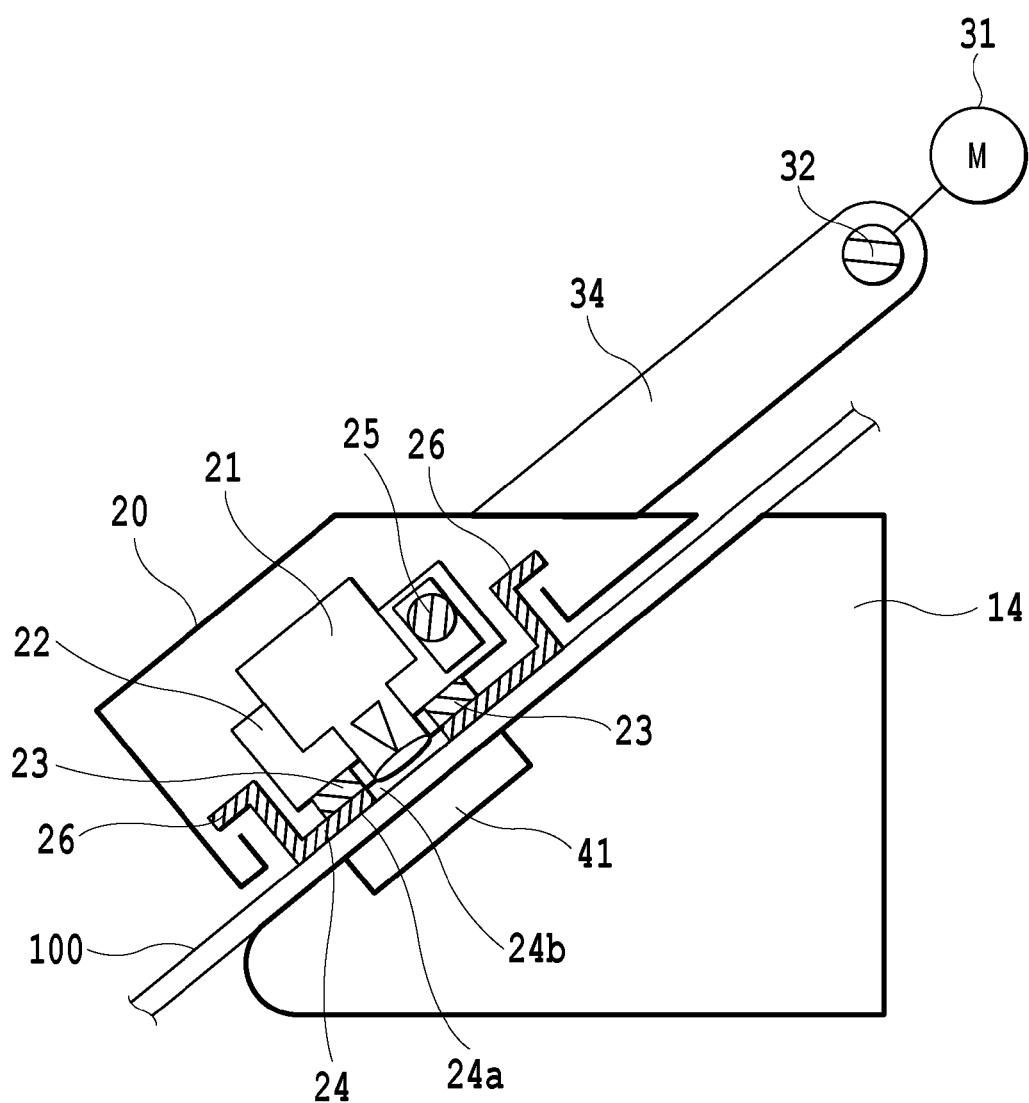
FIG. 2 is a diagram showing a state where a color measuring sensor unit is in a color measuring position.

FIG. 2 is a cross section diametrically showing a state (lowered state) where the color measuring sensor unit 20 according to the present embodiment is in a first position as a color measuring position (use position).

The color measuring sensor unit 20 includes a color measuring sensor 21, a color measuring carriage 22, a sliding member 23, a pressing plate 24, and a sliding shaft 25. The color measuring sensor 21 is held by the color measuring carriage 22. The color measuring sensor 21 emits light on the color patch as a measuring surface to measure color information based upon the light reflected on and returned from the color patch.

The color measuring sensor 21 has two kinds of light sources comprising a first light source of a wavelength properties exhibit having a peak intensity in a wavelength band of 400 nm to 700 nm and a second light source of a wavelength properties exhibit having a peak intensity in a wavelength band of 370 nm to 410 nm. The color measuring sensor 21 further includes one or more light-receiving elements. The two light sources are not limited to these wavelength properties exhibits, but the first light source is only required to be a light source having a peak intensity in a wavelength band of 400 nm or more, and the second light source is only required to be a light source having a peak intensity in a wavelength band of 400 nm or less. The second light source emits light on the measuring surface in an angle of 45 degrees to the first light source.

The color measuring carriage 22 presses the pressing plate 24 through the sliding member 23 provided on a bottom surface thereof, and is slidably supported along the sliding shaft 25 provided in the sheet width direction and the pressing plate 24. The pressing plate 24 is mounted through a hooking member 26 to have a predetermined stroke, and is provided in such a manner that a pressing surface 24a of the pressing plate 24 can make close contact with a packing 41 provided in the discharge guide 14. The pressing plate 24 is provided with a slit 24b opened in a region where the color measuring sensor 21 can move. When the color measuring carriage 22 scans in a state of clipping the roll sheet 100 with the packing 41 and the pressing surface 24a, color measuring of the color patch printed on the roll sheet 100 can be performed. It should be noted that distance accuracy between a surface of the roll sheet 100 and the color measuring sensor 21 is maintained to be constant with high accuracy by the pressing plate 24, the sliding member 23 and the color measuring carriage 22, thus making it possible to obtain stable color measuring accuracy.

Figure 3:
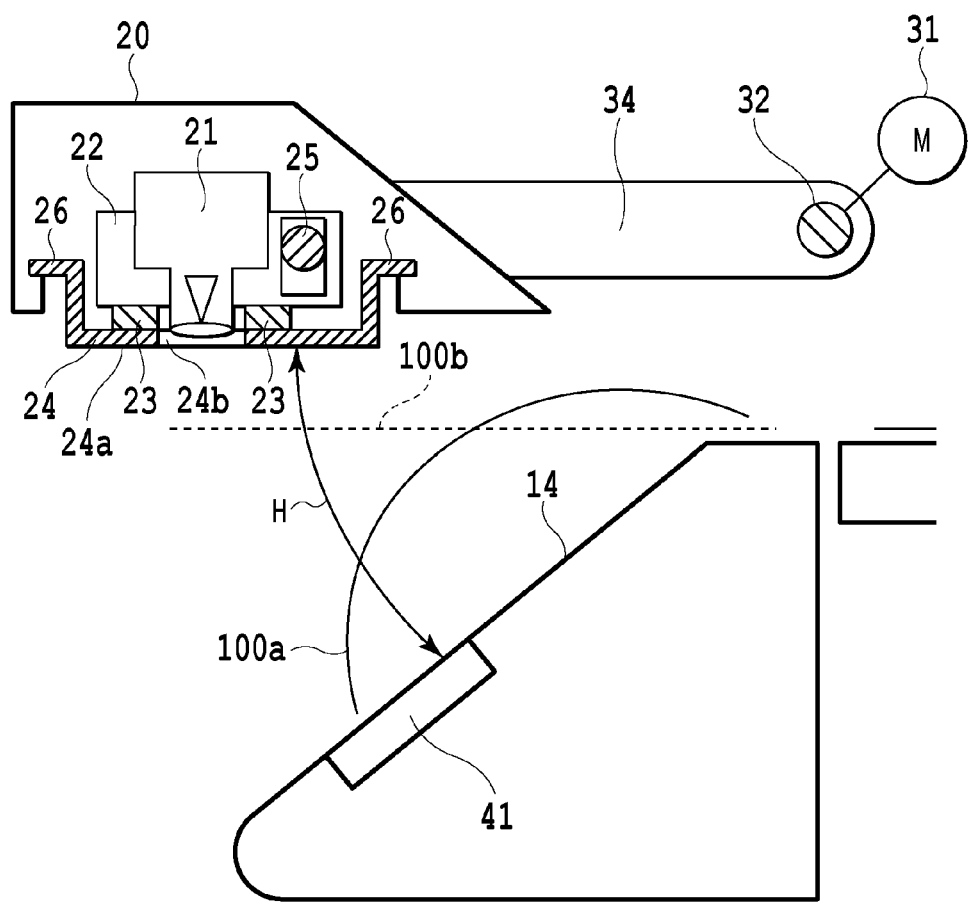
FIG. 3 is a diagram showing a state where a color measuring sensor unit is in a waiting position.

FIG. 3 is a cross section diametrically showing a state (lifted state) where the color measuring sensor unit 20 according to the present embodiment is in a second position as a waiting position. The present figure shows a state where the color measuring sensor unit 20 is in the waiting position higher than the color measuring position shown in FIG. 2. While printing is being performed by the printing means 8, the color measuring sensor unit 20 is required to wait above in a position where an opening H between the discharge guide 14 and the color measuring sensor unit 20 can be ensured so that the surface of the roll sheet 100 does not make contact with the color measuring sensor unit 20.

In a case where the printing is performed on a roll sheet 100a largely curled, the opening H is expanded in the upward side. Therefore the discharge guide 14 is formed so that the downstream side in the conveying direction is lower to the platen 12. On the other hand, in a case where the printing is performed on a roll sheet 100b a little curled, the color measuring sensor unit 20 is retreated to the extent that a low surface of the color measuring means is higher than the platen 12, considering that the roll sheet 100b is conveyed substantially horizontally from the platen 12.

In a case where the color measuring sensor unit 20 is made to wait above, the color measuring sensor unit 20 rotates around a rotary shaft 32, and shifts to the waiting position (lifted state) shown in FIG. 3 by up-and-down means 31. An up-and-down encoder 33 (not shown) for detecting a rotary angle of the color measuring sensor unit 20 is provided on the rotary shaft 32. The up-and-down encoder 33 can detect that the color measuring sensor unit 20 is in the color measuring position as the use position, in the upward waiting position or in the intermediate position. In addition, the up-and-down encoder 33 can lift or lower the color measuring sensor unit 20 in an arbitrary angle between the color measuring position and the upward waiting position in cooperation with the up-and-down means 31 to stop there. It should be noted that the color measuring sensor unit 20 and the rotary shaft 32 are connected by arms 34 at both end portions outside of the sheet width.

Figure 4:
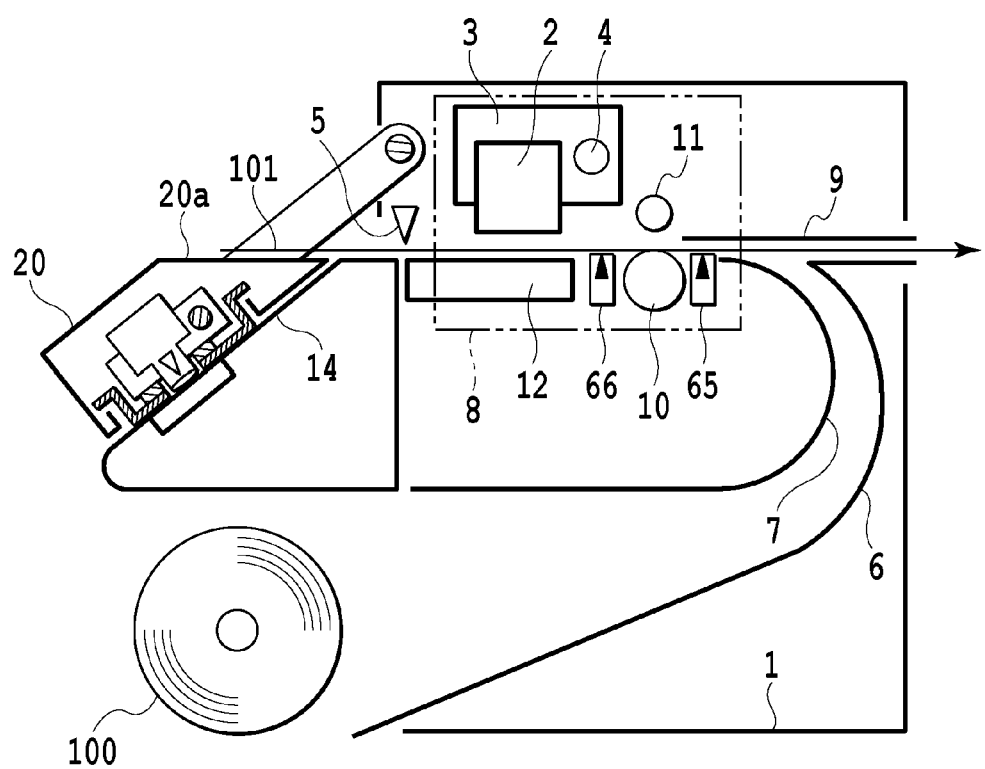
FIG. 4 is a diagram showing the printing apparatus at the time of performing printing on a cut sheet.

FIG. 4 is a cross section diametrically showing a state of the printing apparatus when printing is performed on a cut sheet in advance cut to a standard size according to the present embodiment. Herein an explanation will be made of a case where a user manually feeds a single cut sheet (manual sheet feeding by a user).

A cut sheet 101 is inserted from an opening of the cutter 5 positioned in the forward side of the printing apparatus toward the conveying roller 10 in the upstream side in the conveying direction. The conveying roller 10 and the pinch roller 11 are configured to be pressingly contactable with each other and to be separable from each other, and are controlled to be driven by a nip release motor 63 (not shown). When the cut sheet is inserted in a state where the pinch roller 11 is separated from the conveying roller 10, the cut sheet goes through a straight path 9 in the backward side of the printing apparatus and runs off backward out of the printing apparatus.

In a state where the cut sheet is pressed into the vicinity of the cutter 5, the pinch roller 11 is switched from the separated state to the pressed state, and the cut sheet 101 is conveyed in the upstream direction by the conveying roller 10. In a point where the end of the cut sheet is detected by the sheet end sensor (B) 66 arranged downstream of the conveying roller 10, the conveying roller 10 is stopped to perform printing by the printing means 8. When the printing is finished, the rear end of the cut sheet is conveyed to the sheet end sensor (A) 65, the pinch roller 11 is again switched to the separated state, the printed cut sheet 101 is collected by a user, and the printing is finished.

Here, after the printing is performed on the roll sheet 100, the printing is finished in a state (lifted state) where the color measuring sensor unit 20 is in the waiting position upward of the printing means 8 in the downstream side in the conveying direction. Therefore the color measuring sensor unit 20 results in covering the opening of the cutter 5 at the upward side. On the other hand, after the printing is performed on the cut sheet, the printing is finished in a state where the color measuring sensor unit 20 is in the waiting position downward of the printing means 8 in the downstream side in the conveying direction. Accordingly, in a case where a user performs manual sheet feeding of the cut sheet 101 in this condition, the cut sheet results in being inserted in the depth of the opening H between the color measuring sensor unit 20 and the discharge guide 14, leading to an extremely deteriorated state in operability and visibility for a user.

Therefore, by setting the color measuring sensor unit 20 to be in a lowered state, the opening of the cutter 5 as an insert port of the manual sheet feeding is configured to be visible from above the color measuring sensor unit 20. In addition, a guide surface 20a is configured in an upper end portion of the color measuring unit 20 on a substantially extending line from the platen 12 not to interrupt insert of the sheet. Therefore the operability and the visibility for a user can be ensured at the manual sheet feeding. In addition, insert properties of the manual sheet feeding can be improved by using the upper guide surface 20a (sheet support) as a guide surface of the cut sheet manually fed.

It is preferable that the guide surface 20a has a surface shape on which the sheet is smoothly conveyed (for example, many small ribs are formed thereon along the conveying direction), is made of a material having a small sliding resistance to the sheet or is subjected to processing to have a small resistance to the sheet. Further, since an index such as scale marks for sheet positioning can be printed on the guide surface 20a or a guide shape for striking a sheet side face can be provided, the operability can be further improved.

As described above, a first conveying path passing between the color measuring sensor unit 20 and the discharge guide 14 is formed, and besides, at the time of shifting the color measuring sensor unit 20 to the lowered state, a part of the upper surface of the color measuring sensor unit 20 becomes a support of the sheet to form a second conveying path. When the color measuring sensor unit 20 shifts to the lowered state, even if the color measuring device as the post processing unit is provided downstream of the printing means 8 in the conveying direction, the printing and the color measuring on the roll-shaped roll sheet 100, and the operation of the printing on the cut sheet 101 can be easily performed from the front surface of the apparatus.

Figure 5:
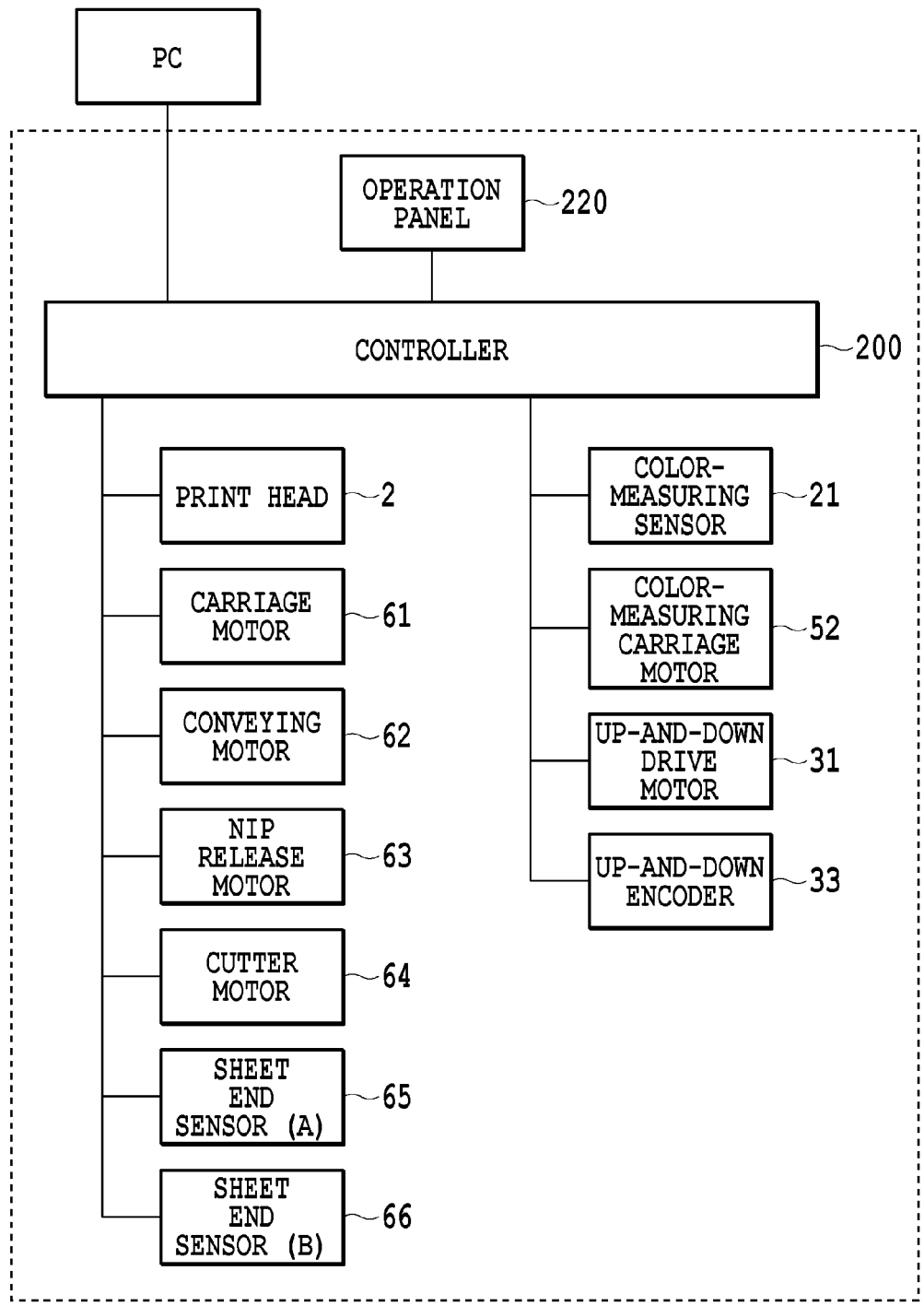
FIG. 5 is a block diagram showing a controller in the inkjet printing apparatus.

FIG. 5 is a block diagram showing a controller in the inkjet printing apparatus according to the present embodiment. The controller 200 is provided with a CPU, a ROM, a RAM, a motor driver, which are not shown, and the like, and receives a printing command and a color measuring command from the PC to perform printing and color measuring. The controller 200 is provided with an operation panel 220 to be operated by a user, and a print head 2 as a device in the printing component. In addition, the controller 200 is provided with motors including a carriage motor 61 for driving the movement of the carriage 3, a conveying motor 62 for driving the conveying roller 10, a nip release motor 63 for driving connection/disconnection of the pinch roller 11, and a cutter motor 64 for driving the cutter 5. Further, the sheet end sensor (A) 65 and the sheet end sensor (B) 66 for detecting the front end and the rear end of the sheet are connected to the controller 200. In this way, the controller 200 controls each device to perform printing of an image on the sheet, and feeding and discharging operations of the sheet. Further, the controller 200 is provided with the color measuring sensor 21 as a device in the color measuring section. In addition, a color measuring carriage motor 52 for driving the movement of the color measuring carriage 22, an up-and-down drive motor 51 for driving the up-and-down means 31 for lifting and lowering the color measuring sensor unit 20, and the up-and-down encoder 33 for detecting an up-and-down position of the color measuring sensor unit 20 are connected to the controller 200. The printed color patch can be automatically color-measured by the cooperated control with the device in the printing component.

Next, an explanation will be made of the operations of the manual sheet feeding of the cut sheet, and the printing and color measuring on the cut sheet.

Figure 6:
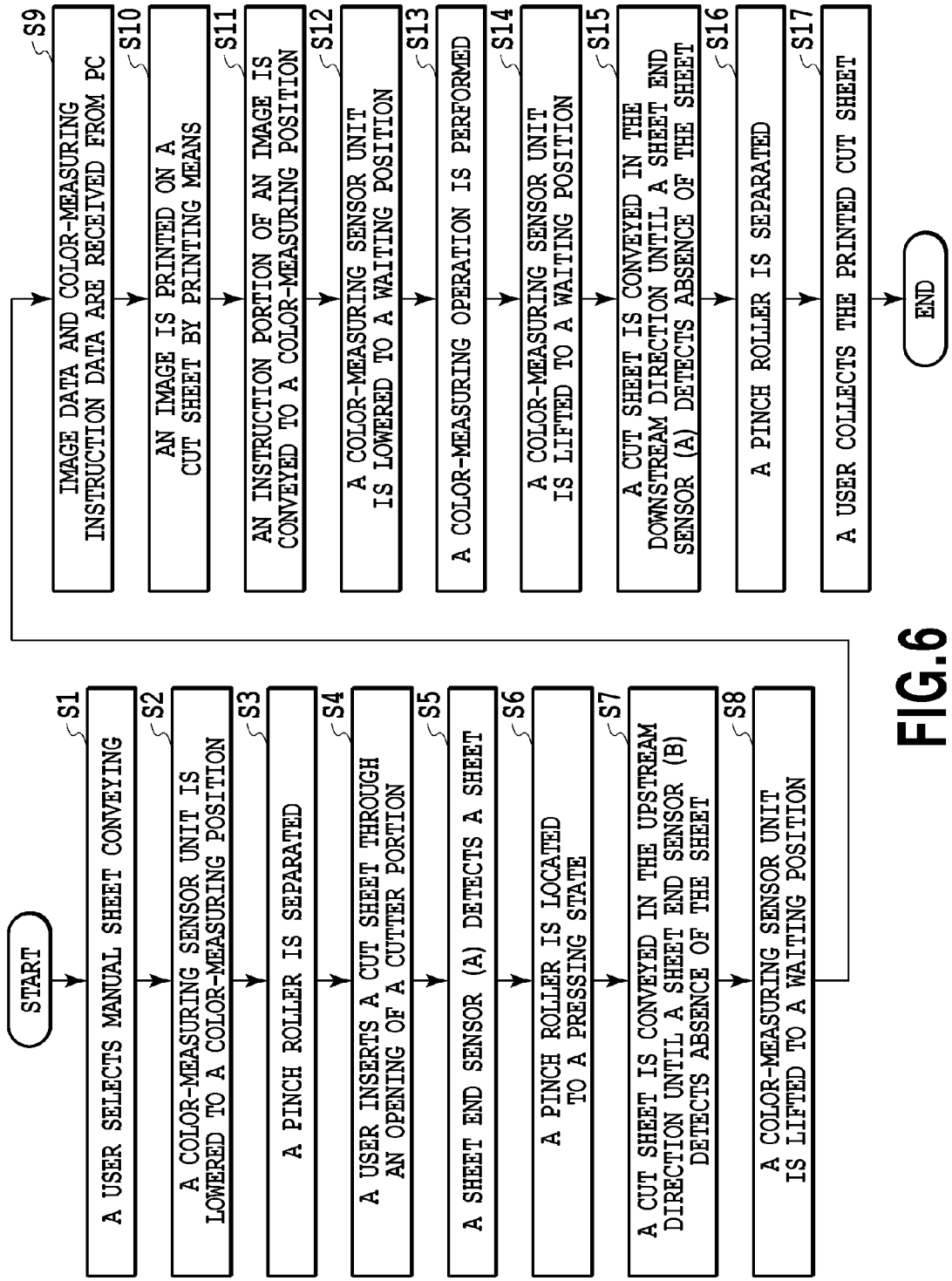
FIG. 6 is a flow chart showing the procedure of a printing operation.

FIG. 6 is a flow chart showing the procedure of the printing operation according to the present embodiment. In addition, FIG. 7A to FIG. 7F are cross sections diametrically showing the operation of the printing apparatus according to the present embodiment.

Figure 7A:
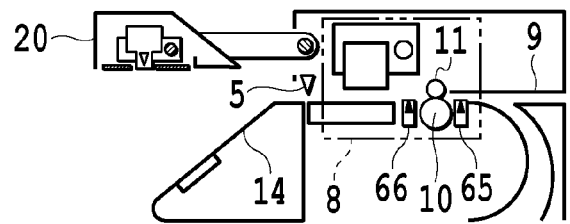
FIG. 7A to FIG. 7F are cross sections diametrically showing an operation of the printing apparatus.

FIG. 7A shows a waiting state before receiving a command of manual sheet feeding. The color measuring sensor unit 20 is in a state of waiting in the upward waiting position.

Figure 7B:
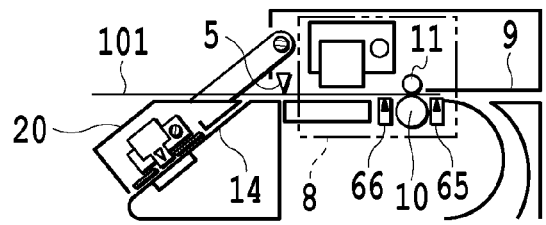

A user inputs designation of the manual sheet feeding by the operation panel 220 (step S1). As shown in FIG. 7B, the color measuring sensor unit 20 is lowered to the color measuring position by the up-and-down means 31 (step S2), and along with it, the nip release motor 63 is driven to separate the pinch roller 11 from the conveying roller 10 (step S3). The user inserts the cut sheet 101 to pass between the conveying roller 10 and the pinch roller 11 from the opening in the vicinity of the cutter 5 (step S4). When the sheet end sensor (A) 65 detects the front end of the cut sheet 101 (step S5), the nip release motor 63 is driven to pressingly connect the conveying roller 10 and the pinch roller 11 again (step S6).

Figure 7C:
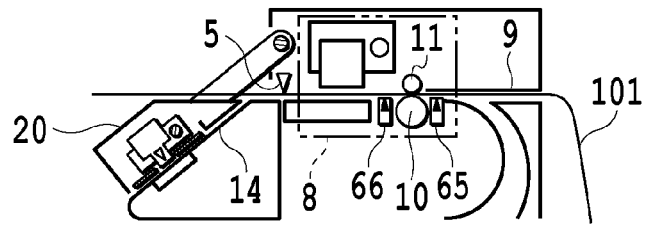

As shown in FIG. 7C, until the sheet end sensor (B) 66 detects absence of the sheet, the cut sheet 101 is conveyed in the upstream direction by the conveying roller 10 (step S7). Subsequently the color measuring sensor unit 20 is lifted to the upward waiting position shown in FIG. 7D (step S8).

Figure 7D:
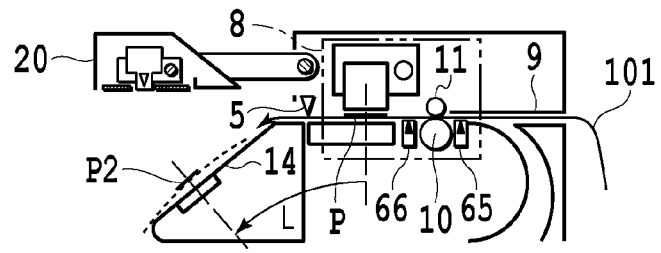

The controller 200 receives image data and color measuring instruction data sent from the PC (step S9). The printing means 8 prints an image on the cut sheet 101 based upon the image data. FIG. 7D shows a state where the color patch P is printed on the cut sheet 101 (step S10).

Figure 7E:
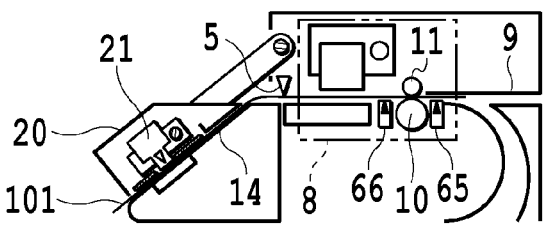

When the printing is finished, the cut sheet 101 is conveyed by a distance L, and the printed color patch P is conveyed to a taking position P2 (step S11). As shown in FIG. 7E, the printed color patch P is clipped by the lowered color measuring sensor unit 20 and the discharge guide 14 (step S12). The color measuring carriage motor 52 is driven to make the color measuring carriage 22 scan, and the measurement of color characteristics of the color patch P as a measurement object is conducted by the color measuring sensor 21 (step S13).

Figure 7F:
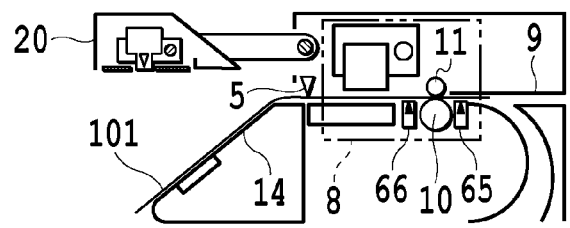

When the color measuring is finished, as shown in FIG. 7F, the color measuring sensor unit 20 is again lifted to the upward waiting position (step S14). The cut sheet 101 is conveyed in the downstream direction until the sheet end sensor (A) 65 detects absence of the sheet (step S15), and the nip release motor 63 is driven to separate the pinch roller 11 from the conveying roller 10 (step S16). Thereafter, a user collects the cut sheet, and the printing and the color measuring are finished.

As described above, the first conveying path passing between the discharge guide 14 and the color measuring sensor unit 20 is formed when the color measuring sensor unit 20 is in the second position, and besides, the second conveying path using a part of the upper surface of the color measuring sensor unit 20 as a sheet passing path is provided by the up-and-down means 31. As a result, even in a case where the color measuring device as the post processing unit is provided downstream of the printing means 8 in the conveying direction, the printing and color measuring on the roll sheet, and the operation of the printing on the cut sheet can be easily performed from the front surface of the apparatus.

(Second Embodiment)

According to the first embodiment, at the time of performing the manual sheet feeding, the sheet passes through the second conveying path using a part of the upper surface of the color measuring sensor unit 20 as the sheet passing path, and at the time of not performing the manual sheet feeding, the sheet passes through the first conveying path passing between the discharge guide 14 and the color measuring sensor unit 20. However, the present invention is not limited to this switching condition.

Figure 8:
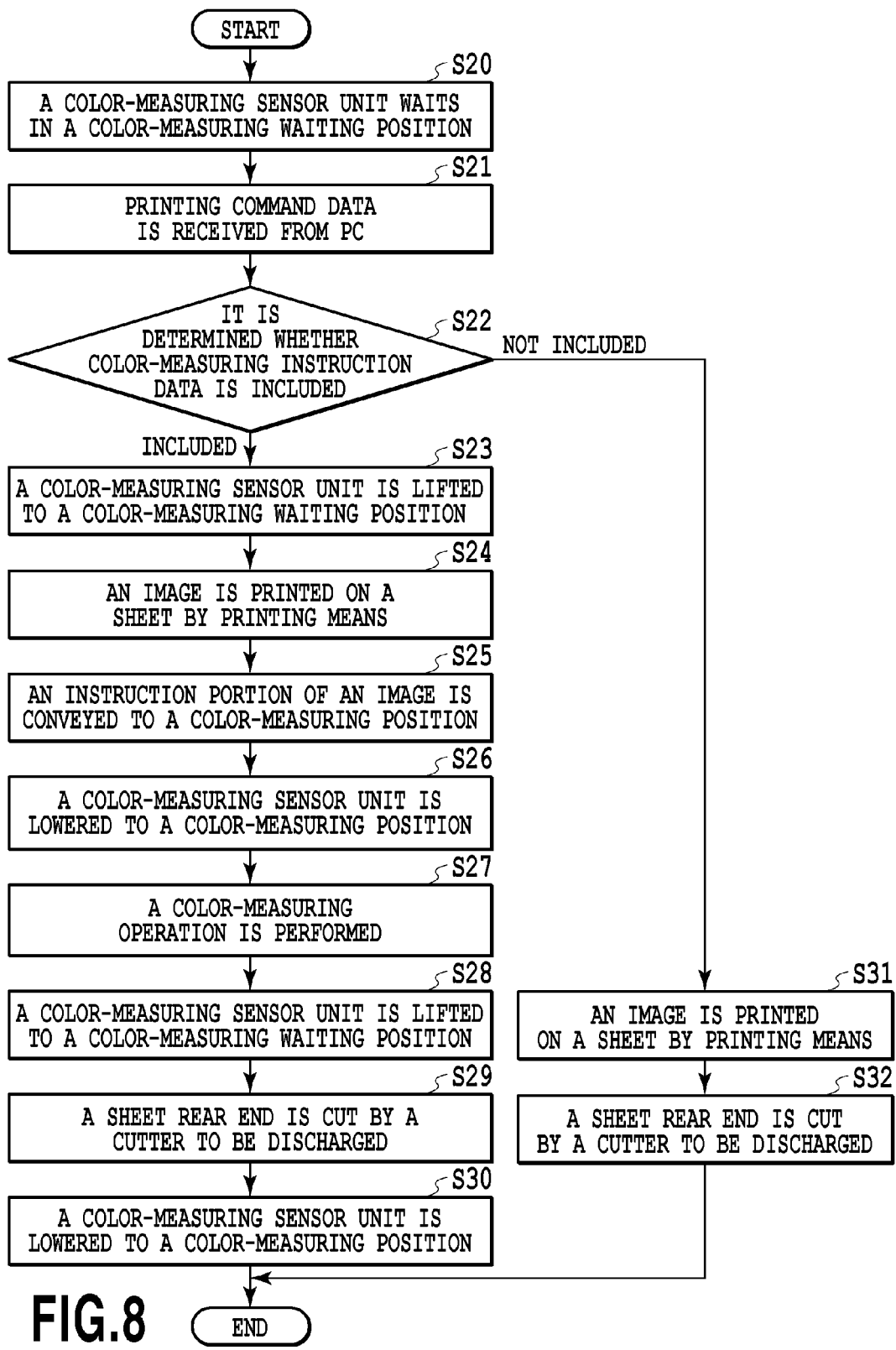
FIG. 8 is a flow chart showing the procedure of a conveying-path switching operation in an inkjet printing apparatus according to a second embodiment.

FIG. 8 is a flow chart showing the procedure of the switching operation between the first conveying path and the second conveying path according to the present embodiment. It should be noted that an explanation will be made using the roll sheet 100 in the present embodiment, but the printing and the color measuring can be performed using the similar conveying path also in the cut sheet 101.

At the waiting time the printing operation is not performed and there is no printing command from the PC, the color measuring sensor unit 20 is lowered to be in the first position to form the second conveying path using the guide surface 20a which is a part of the upper surface of the color measuring sensor unit 20 as the sheet passing path (step S20). When the controller 200 receives printing command data from the PC (step S21), the controller 200 determines whether or not color measuring instruction data is included in the printing command data (step S22).

In a case where the color measuring data is included, the color measuring sensor unit 20 is lifted to the upward color measuring waiting position to be arranged in the second position, and the conveying path is switched to the first conveying path where the sheet passes between the discharge guide 14 and the color measuring sensor unit 20 (step S23). Printing of the color patch is performed on the roll sheet 100 by the printing means 8 (step S24).

When the printing is finished, the printed color patch is conveyed to a color measuring reading position (step S25). The color measuring sensor unit 20 is lowered to the color measuring position (use position) as the second position to be in the lowered position, wherein the printed color patch is clipped between the color measuring sensor unit 20 and the discharge guide 14 (step S26). The color measuring carriage motor 52 is driven to make the color measuring carriage 22 scan, and the measurement of color characteristics of the color patch as a measurement object is conducted by the color measuring sensor 21 (step S27). When the color measuring is finished, the color measuring sensor unit 20 is again lifted to the upward color measuring waiting position (step S28). Thereafter, the roll sheet 100 is conveyed, the rear end of the printed portion is cut by the cutter 5, and then the sheet is discharged (step S29). Finally the color measuring sensor unit 20 is lowered to be returned to the waiting position (step S30), and is thus returned to the original state at the waiting time to complete the operation.

On the other hand, in a case where the color measuring instruction data is not included, an image is printed on the roll sheet 100 by the printing means 8 in the waiting state where the color measuring sensor unit 20 is lowered (step S31). When the printing is finished, the roll sheet 100 is conveyed, the rear end of the printed portion is cut by the cutter 5, and then the sheet is discharged to complete the operation (step S32). At this time, the printed roll sheet 100 passes through the upper surface of the color measuring sensor unit 20 to be discharged.

By setting the switching condition of the conveying path to the aforementioned method, the color measuring sensor unit 20 is located to the downward waiting position other than at the printing time accompanied by the color measuring. This configuration can prevent a state where the color measuring sensor unit 20 covers the opening of the cutter 5 at the upward side, thus improving the operability and the visibility for a user from the front surface of the printing apparatus.

Further, since the color measuring sensor unit 20 can be regularly located in a closed state, the entering of dusts or foreign objects from outside and a fading change of the packing surface 41 and the like due to external light can be reduced.

(Third Embodiment)

In the first and second embodiments, an explanation is made of the printing apparatus where the color measuring unit is provided in addition to the printing means, but the present invention may be applied to a printing apparatus where a unit other than the color measuring unit is provided.

Figure 9A:
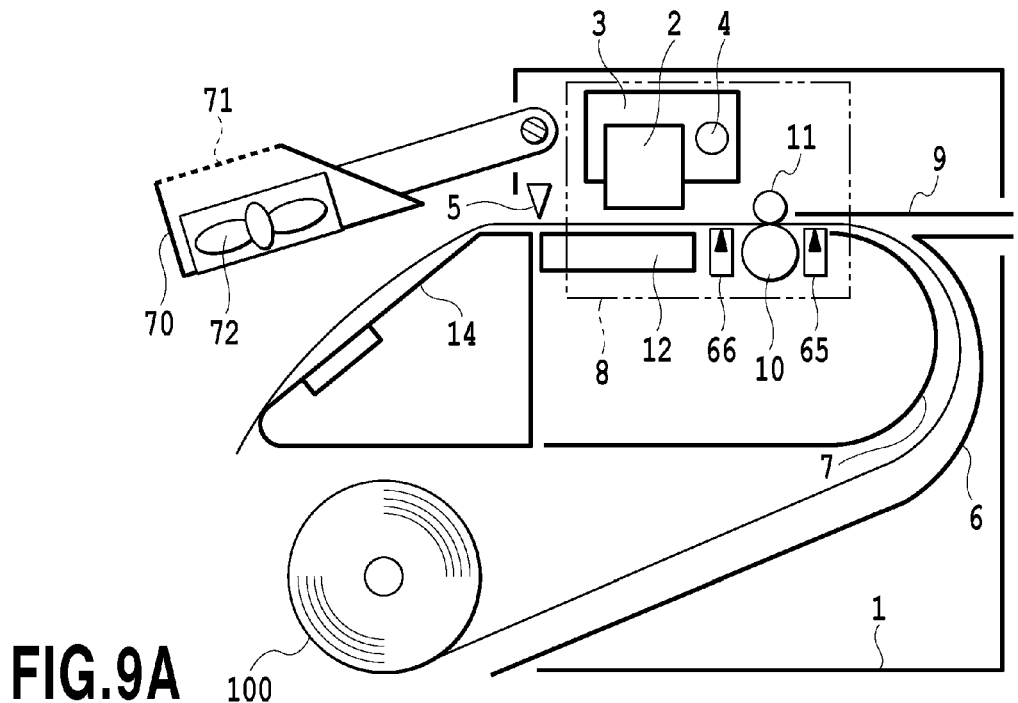
FIG. 9A and FIG. 9B are diagrams showing an inkjet printing apparatus provided with a drying device according to a third embodiment.
Figure 9B:
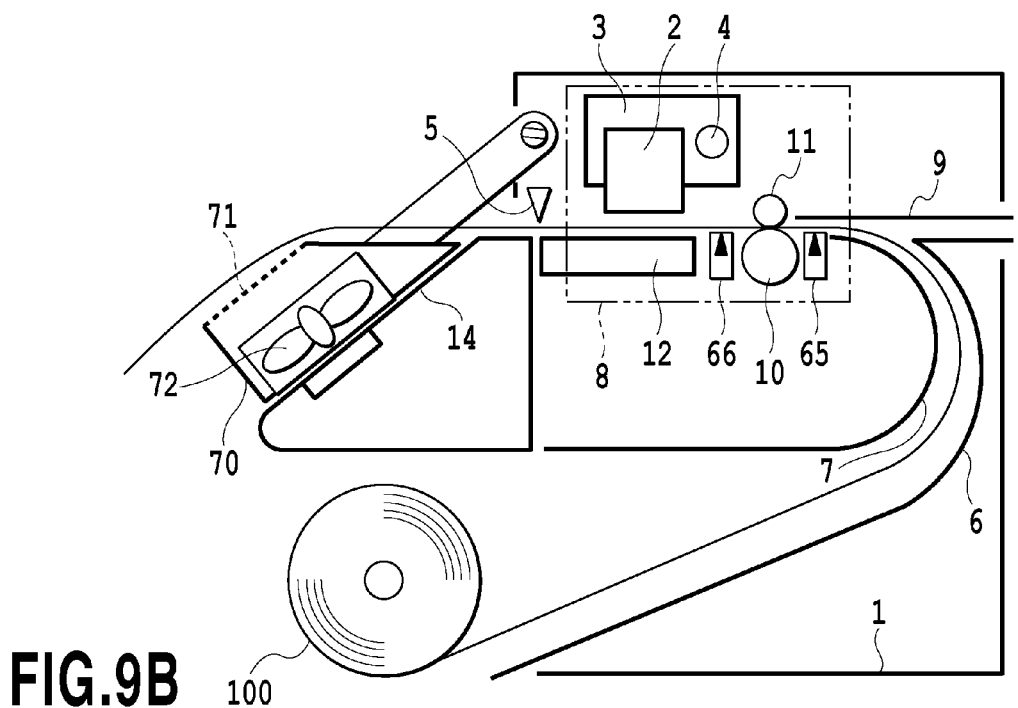

FIG. 9A and FIG. 9B are cross sections diametrically showing an inkjet printing apparatus provided with a drying device (drying section) according to the present embodiment. FIG. 9A shows a state where a drying unit 70 is lifted, and FIG. 9B shows a state where the drying unit 70 is lowered.

As shown in FIG. 9A, the drying unit 70 for drying the roll sheet 100 after printing is provided downstream of the printing means 8 in the conveying direction. The drying unit 70 is provided with a plurality of blower fans 72 in the sheet width direction and includes a louver 71 on an upper surface thereof to be communicated with air. With a drive of the blower fan 72, the air taken in from the louver 71 is made to hit uniformly toward the front surface of the roll sheet 100 after printing, thus making it possible to accelerate the drying of ink applied on the roll sheet 100.

There are some cases where the drying is not necessary in a case where the printing is performed on a sheet having a high ink absorption property, such as a gloss sheet, but there are many cases where in a sheet such as a film, absorption of ink is bad and the drying is necessary. The drying unit 70 shifts by power of the up-and-down means 31 as similar to the color measuring sensor unit 20.

When the operation panel 220 instructs to perform the drying after printing, the drying unit 70 is lifted to the second position, and the conveying path is switched to the first conveying path passing between the discharge guide unit 14 and the color measuring sensor unit 20. It should be noted that in a case where the operation panel 220 inputs a kind of the sheet to select a sheet such as a film requiring more time for fixation of ink, the conveying path may be switched to the first conveying path for performing the drying.

On the other hand, in a case where the drying is not performed, as shown in FIG. 9B, the drying unit 70 does not shift to stay in the lowered state of the first position, and a part of the upper surface of the drying unit 70 is used as the second conveying path to become a sheet passing path.

As explained above, also in the printing apparatus provided with the drying device as the post processing unit downstream of the printing means in the conveying direction, the operability and visibility for a user from the front surface of the printing apparatus can be improved in a state where the configuration of being capable of performing the drying process by the drying device is maintained.

(Fourth Embodiment)

In the first to third embodiments, the switching between the first conveying path and the second conveying path is made by rotating (swinging) the post processing unit such as the color measuring unit to be raised/lowered. On the other hand, in the present embodiment, a post processing unit is not rotated, but is linearly raised/lowered.

FIG. 10A and FIG. 10B are cross sections diametrically showing an inkjet printing apparatus provided with a color measuring section in which a color measuring sensor unit is integral with a packing according to the present embodiment. FIG. 10A shows a state (lifted position) where the color measuring section is in a position (second position) of effecting color measurement, and FIG. 10B shows a state (lowered position) where the color measuring section is lowered to a first position.

The printing apparatus according to the present embodiment is provided with a color measuring section 45, in which a color measuring sensor unit 20 is integral with a packing 41, downstream of the printing means 8 in the conveying direction. The roll sheet 100 after printing is led to a conveying path between a pressing plate 24 and the packing 41 provided inside of the color measuring section 45.

In the first embodiment, the roll sheet 100 after printing is clipped between the pressing surface 24a of the pressing plate 24 and the packing 41 by lowering the color measuring sensor unit 20 to perform the color measuring, but in the present embodiment, the pressing plate 24 only is driven to be swung.

First, in a state where the color measuring section 45 is in the color measuring position (second position) as a use position, the pressing plate 24 is lowered to clip the roll sheet 100 after printing between the pressing surface 24a and the packing 41, wherein a color measuring carriage 22 scans on the pressing plate 24 in the sheet width direction, thereby performing the color measuring. When the pressing plate 24 is lifted to convey the roll sheet 100, the color measuring carriage 22 is retreated outside of the roll sheet 100 in the sheet width direction, and the pressing plate 24 is lifted. The pressing surface 24a is thus released from the packing 41. At this time, as similar to the first embodiment, at the time of manually feeding the cut sheet 101, the sheet is inserted in the depth of the opening H between the pressing plate 24 and the packing 41, leading to a state where the operability and visibility for a user become extremely deteriorated.

Therefore, as shown in FIG. 10B, the color measuring section 45 in which the color measuring sensor unit 20 is integral with the packing 41 is entirely lowered in parallel to be lowered to the first position. In this way, the conveying path is switched to a conveying path of using an upper surface of the color measuring section 45 as a guide surface (sheet support), and the manual sheet feeding of the cut sheet 101 is performed. The opening of the cutter 5 as an insert port of the manual sheet feeding is completely visible, and the guide surface 20a (sheet support) is configured as a surface substantially flush with the platen 12 in such a manner as not to interrupt insert of the sheet. Therefore the operability of a user in the manual sheet feeding can be ensured. It is preferable that the guide surface 20a is formed as a surface shape on which the sheet is smoothly conveyed (for example, many small ribs are formed thereon along the conveying direction), is made of a material having a small sliding resistance to the sheet, or is processed such that a sliding resistance to the sheet is made small.

Further, as compared to a case where the manual sheet feeding is performed from the front surface of the color measuring section, a user can insert the cut sheet 101 to the deeper side because the user can reach the sheet to the opening of the cutter 5 by hands. Therefore the printing can be performed on a shorter cut sheet 101.

As explained above, also in a state where the post processing device to be raised/lowered in parallel is provided downstream of the printing means 8 in the conveying direction, the operability and visibility for a user from the front surface of the apparatus can be improved.

(Fifth Embodiment)

Figure 11:
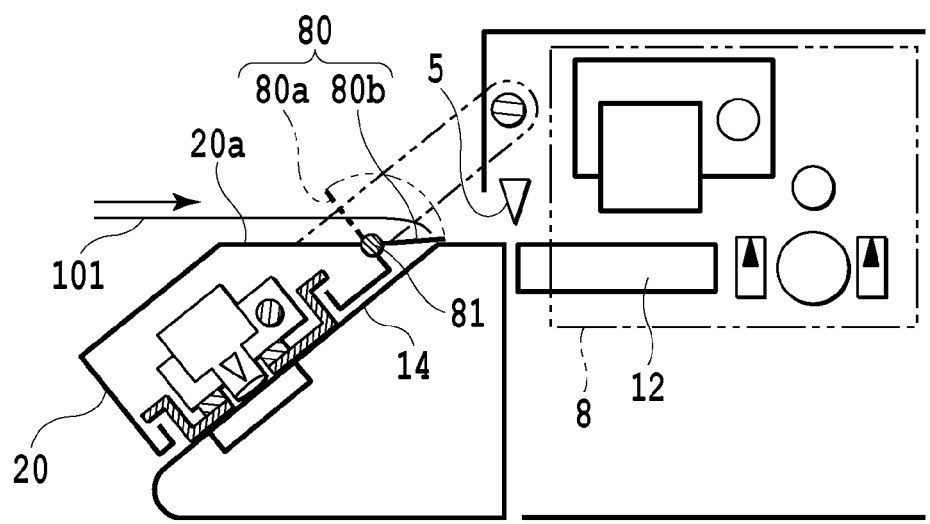
FIG. 11 is a cross section diametrically showing an inkjet printing apparatus according to a fifth embodiment.

FIG. 11 is a cross section diametrically showing an inkjet printing apparatus according to the present embodiment. As similar to the first embodiment, at the time of manually feeding the cut sheet 101, the color measuring sensor unit 20 is lowered to use the guide surface 20a as a part of the upper surface of the color measuring sensor unit 20 as the sheet passing path. A guide member 80 swinging around a shaft 81 is provided in the end portion of the guide surface 20a to be positioned in a side of the printing means 8. The guide member 80 is urged in the counterclockwise direction by a spring (not shown), and is in a position 80a. When the cut sheet 101 is set to the guide surface 20a and is inserted toward the opening of the cutter 5, the guide member 80 swings in the clockwise direction by the insert force to be rotated to a position 80b.

The guide member 80 performs as a bridge for the conveying path from the guide surface 20a to the discharge guide 14. Therefore the front end of the cut sheet 101 can be certainly inserted toward the discharge guide 14. After the rear end of the cut sheet 101 passes through the guide member 80, the guide member 80 is returned to the position 80a by the urging of the spring.

It should be noted that in the present embodiment, an explanation is made of the configuration of operating the guide member 80 by the spring, but the present invention is not limited to such a configuration. For example, the guide member may be manually operated. In addition, in the present embodiment, an explanation is made of the configuration that the guide member 80 swings to be operated, but the present invention is not limited thereto. For example, the guide member 80 may be slid to be operated.

As explained above, at the time of conveying the sheet from the downstream side in the conveying direction to the upstream side in the conveying direction, the front end of the sheet does not catch on the step of the conveying path. Therefore the operability and visibility for s user from the front surface of the apparatus can be improved.

(Sixth Embodiment)

In addition to the embodiment of lifting/lowering the color measuring sensor unit for the conveying path to differ therebetween, an explanation will be made of an embodiment where a position of the color measuring sensor unit differs between at the time of manually feeding the cut sheet and at the time of performing printing on the cut sheet.

Figure 12A:
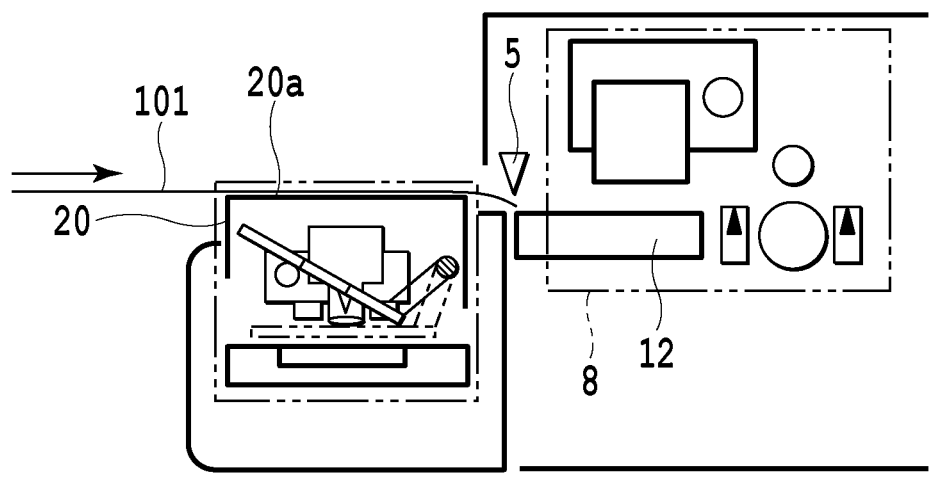
FIG. 12A and FIG. 12B are cross sections diametrically showing an inkjet printing apparatus according to a sixth embodiment.
Figure 12B:
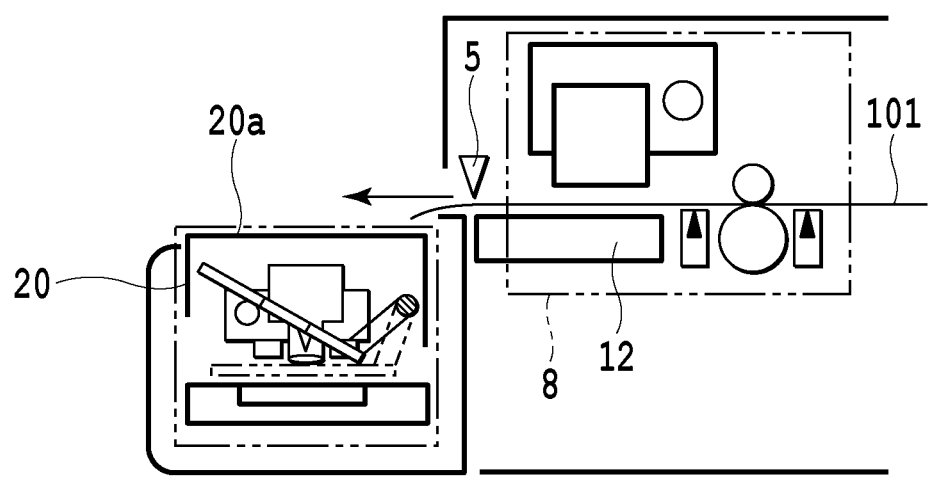

FIG. 12A and FIG. 12B are cross sections diametrically showing an inkjet printing apparatus provided with a color measuring device according to the present embodiment. FIG. 12A shows a state where the color measuring device is arranged in a high position, and FIG. 12B shows a state where the color measuring device is arranged in a low position.

The color measuring sensor unit 20 can shift to an arbitrary position in cooperation with the up-and-down means 31. With this configuration, the color measuring sensor unit 20 is arranged in the high position as shown in FIG. 12A at the time of manually feeding the cut sheet 101. Since the guide surface 20a is in a position higher than the platen 12, the cut sheet 101 can be stably inserted toward the opening of the cutter 5 by setting the cut sheet 101 to the guide surface 20a for insert.

On the other hand, at discharging, the color measuring sensor unit 20 is arranged in the low position as shown in FIG. 12B. Since the guide surface 20a is in a position lower than the platen 12, the printed sheet discharged from the platen 12 can be stably supported by the guide surface 20a.

As explained above, at the time of conveying the sheet from the downstream side in the conveying direction to the upstream side in the conveying direction, as well as at the time of conveying the sheet from the upstream side in the conveying direction to the downstream side in the conveying direction, the front end of the sheet does not catch on the step of the conveying path, and therefore the sheet can be stably conveyed.

As described above, an explanation is made of a case where the present invention is adopted in the inkjet printing apparatus, but the present invention is not limited to the inkjet system, but can be applied to printing apparatuses for performing color printing by an electro-photographic system, a thermal system, or the other various kinds of printing systems.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-079280, filed Mar. 30, 2012, which is hereby incorporated by reference herein in its entirety.

What is claimed is:

1. A printing apparatus, comprising:
   a first unit configured to perform printing on a sheet; and
   a second unit configured to perform a predetermined process for the sheet, the second unit being capable of shifting between a first position and a second position,
   wherein a part of the second unit becomes a support of the sheet for printing by the first unit when the second unit is in the first position, and the part does not become the support when the second unit is in the second position, and
   wherein when the second unit is in the second position, the predetermined process is performed for the sheet in a first path lying under the second unit, and when the second unit is in the first position, a second path including a path upon the support is formed and the sheet can be conveyed through the second path for printing by the first unit.

2. A printing apparatus according to claim 1, wherein the second unit is capable of being lifted from the first position to the second position.

3. A printing apparatus according to claim 1, wherein the second unit performs the predetermined process in the first position, and does not perform the predetermined process in the second position.

4. A printing apparatus according to claim 1, wherein the first unit includes an inkjet head for printing.

5. A printing apparatus according to claim 1, wherein when the second unit is in the first position, the sheet can be supplied through the second path toward the first unit for printing.

6. A printing apparatus according to claim 5, wherein the sheet for the printing is supplied to the second path by a user.

7. A printing apparatus according to claim 1, wherein the second unit includes a measuring section configured to perform a color measuring process for the sheet on which color patterns are printed by the first unit, as the predetermined process.

8. A printing apparatus according to claim 1, wherein the second unit includes a drying section configured to perform a drying process for the sheet printed by an inkjet head in the first unit, as the predetermined process.

9. A printing apparatus, comprising:
   a first unit configured to perform printing on a sheet; and
   a second unit configured to perform a color measuring process for the sheet on which color patterns are printed by the first unit, the second unit being capable of shifting between a first position and a second position,
   wherein a part of the second unit becomes a support of the sheet for printing by the first unit when the second unit is in the first position, and the part does not become the support when the second unit is in the second position.

10. A printing apparatus according to claim 9, wherein the second unit is capable of being lifted from the first position to the second position.

11. A printing apparatus according to claim 9, wherein the second unit performs the color measuring process in the first position, and does not perform the color measuring process in the second position.

12. A printing apparatus according to claim 9, wherein when the second unit is in the second position, the color measuring process is performed for the sheet in a first path lying under the second unit, and when the second unit is in the first position, a second path including a path upon the support is formed and the sheet can be conveyed through the second path for printing by the first unit.

13. A printing apparatus according to claim 9, wherein the first unit includes an inkjet head for printing.

* * * * *